Patented Nov. 17, 1953

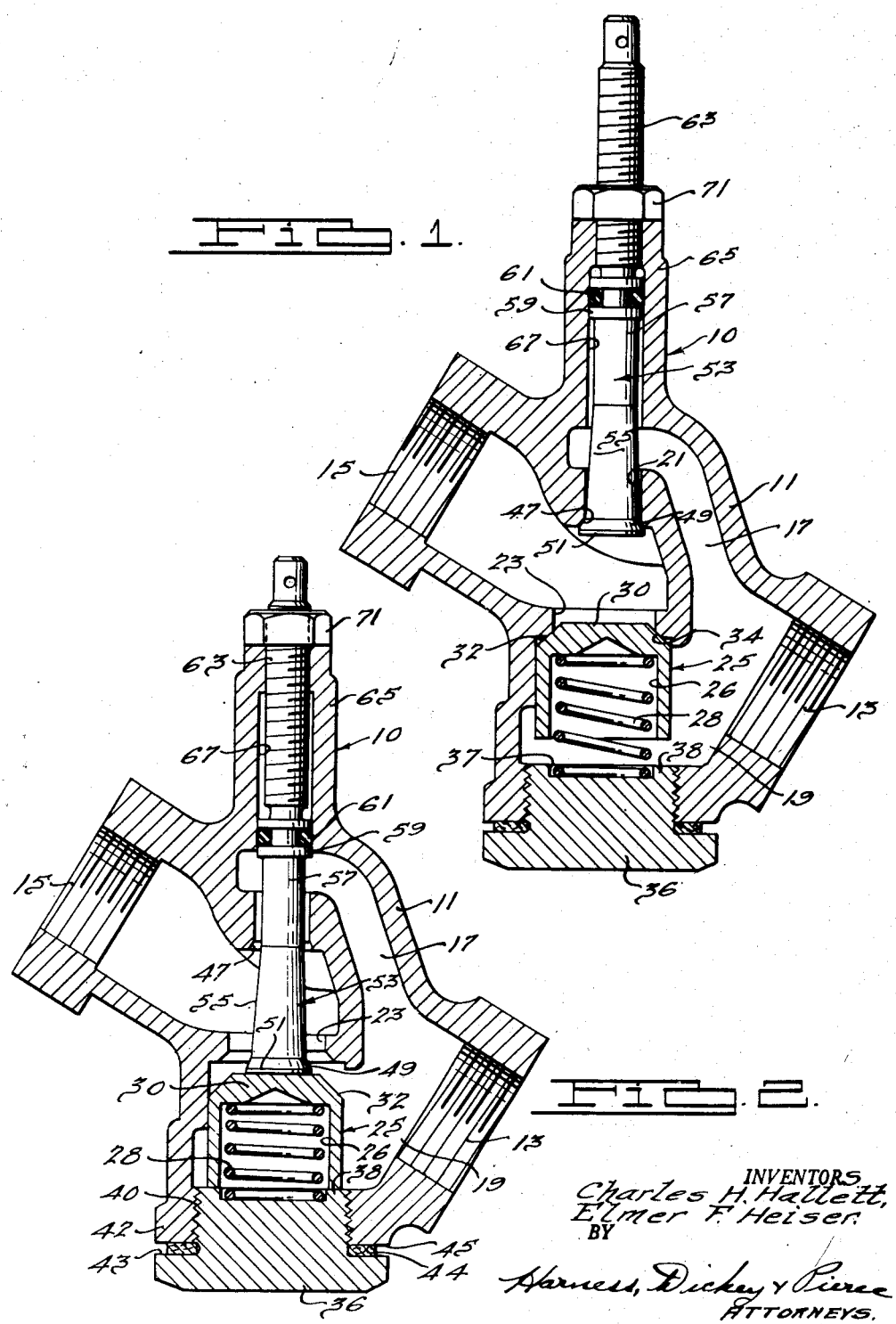

2,659,386

UNITED STATES PATENT OFFICE 2,659,386

SPEED CONTROL VALVE

Charles H. Hallett, Cleveland, and Elmer F. Heiser, Parma, Ohio, assignors to Ross Operating Valve Company, Detroit, Mich., a corporation of Michigan Application March 13, 1952, Serial No. 276,258

1 Claim. (Cl. 137—630.22)

The present invention relates to a speed control valve for fluid operating systems and more particularly relates to a valve construction primarily for air circuits of the type in which a pair of ports are connected by parallel passageways, one of the passageways being provided with a check valve and the other passageway containing an adjustable metering valve.

A somewhat similar construction has been proposed in U. S. Patent 2,365,892 to McLeod. The present invention constitutes an improvement on the McLeod construction and differs therefrom primarily in providing a check valve of simpler and more compact construction which is free of internal metering ports. The present construction additionally differs in that it enables the opening of the check valve in response to the controlled movement of the metering valve while concurrently eliminating the necessity for maintaining accurate alignment between the metering and check valves.

It is, therefore, an object of the present invention to provide a speed control valve which is simple and inexpensive of construction and which is positive and efficient in operation.

Another object is to provide a pneumatic speed control valve which provides in operation accurately controlled flow rates in one direction and substantially unrestricted flow in the opposite direction, and which enables controlled fluid speeds continuously from extremely slow rates of flow up to and including substantially unrestricted flow.

Other objects and advantageous features of the invention will become apparent when the present disclosure is considered in its entirety.

In the drawing:

Figure 1 is a vertical sectional view of the speed control valve of this invention illustrating the metering valve element in its fully closed position; and Fig. 2 is a vertical sectional view of the valve of Fig. 1 illustrating the metering valve element in its fully open position.

Referring more specifically to the drawing, there is illustrated in Figs. 1 and 2 a valve generally designated 10 having a housing 11 provided with a pair of generally aligned ports 13 and 15 connected by a pair of passageways 17 and 19 through control port 21 and check valve port 23 respectively.

Check valve port 23 is substantially aligned with control port 21 and is provided with a check valve member 25. Check valve 25, as shown, is in the form of a modified cylinder having a bore 26 adapted to accommodate closing means, such as a conventional spring 28. The upper end 30 of valve 25 is beveled to form contact surface 32 which abuts check valve seat 34 to form an air tight seal. The lower end of spring 28 is in abutment with and seats in recessed portion 37 of adjustable plug 36. Plug 36 is provided with an upper externally threaded portion 38 which is adapted to engage internal threads 40 carried by the lower extension 42 of housing 11. Packing 44 of any suitable nature is provided between the upper surface 43 of plug 36 and the lower surface 45 of extension 42 to insure an airtight connection therebetween. It will be appreciated that check valve 25 may assume a variety of forms or shapes, such as a ball poppet, a solid plug or the like and that the means urging the valve into its normally closed portion may likewise be varied and adapted to cooperate with other forms of check valves in a manner which will be clear to those skilled in the art.

Fixed control port 21 is substantially cylindrical but is provided at its lower extremity with a short flared portion 47 adapted to coact with and to seat against correspondingly tapered surface 49 on the lower flared extremity 51 of axially adjustable metering valve element 53. Metering valve element 53 is provided with an elongated tapered portion 55 converging toward its axis in an upward direction and terminating in a straight diameter intermediate portion 57. The diameter of portion 57 is in all cases somewhat smaller than the diameter of fixed control port 21, and it will be appreciated that the particular diameter selected will vary with and depend upon the liquid flow requirements of the particular application involved. Similarly the degree of taper of portion 55 may likewise vary relative to the diameter of port 21 to accommodate a variety of end uses, and it is to be understood that the contoured portion 55 may be replaced by other equivalent means of metering fluid flow, such as a slotted stem construction or the like.

Integral with intermediate portion 57 of valve element 53 is a bearing portion 59 and an upper extension portion 63 which is adapted to extend upwardly through and out of upright portion 65 of housing 11. Portion 65 is provided with a central bore 67 which acts as a containing cylinder for the axial travel of valve element 53. An air tight connection is maintained between the wall of bore 67 and movable valve element 53 by suitable seal such as the O-ring 61 positioned in bearing portion 59. Upper portion 63 is provided with threads adapted to engage internally threaded locking nut 71. Other means for securing the vertical adjustment of valve element 53 may be employed such as a lever arrangement or the like.

In operation, fluid under pressure such as compressed air enters port 15 and exerts a pressure on the upper end surface of check valve 25, forcing it downward against spring 29 thereby providing substantially unrestricted or free flow through port 23. In the event metering valve element 53 is positioned in an intermediate position between the extreme positions illustrated in Figs. 1 and 2, it will be clear that a minor portion of the fluid will travel upwardly through port 21 and through parallel passageway 17 to port 13. Such parallel travel or initial leakage does not substantially alter the operation of check valve 25 because in all cases the effective size of port 21 is less than that of port 23.

Upon the cessation of pressure in the free flow direction check valve 25 resumes its normally closed position. Fluid under pressure entering port 13 is thereby forced to travel through parallel passageway 17, through fixed control port 21 to port 15. In the closed position of metering valve element 53 as illustrated in Fig. 1 no flow in the controlled flow direction would be possible. However, by adjusting valve element 53 downwardly a controlled rate of flow may be obtained. As mentioned hereinabove, extremely low, controlled flow rates may be obtained depending upon the axial position of the element 53. Continued downward travel of valve element 53 increases the flow rate in the controlled flow direction until the tapered portion 55 has completely traveled through port 21. As may be seen in Fig. 2, when the upper end of tapered portion 55 reaches the lower end of port 23 the lower surface of flared portion 51 contacts or abuts the upper surface of the enlarged portion 30 of check valve 25. Further downward travel of valve element 53 opens check valve 25 thereby providing a further controlled increase in the flow rate up to substantially unrestricted flow.

An especially advantageous feature of the simplified construction of this invention is the extremely broad tolerances which may be permitted in the manufacture of these valves without sacrificing accuracy in the control of the rate of flow. It is unnecessary, for example, to maintain precision alignment of check valve port 23 and fixed control port 21 inasmuch as variations in alignment merely vary the point on valve 25 which is engaged by valve element 53 without altering in any way the overall operation of the valve.

What is claimed is:

A speed control valve including a housing having inlet and outlet chambers and an interior fixed control port connecting said chambers, openings in said inlet and outlet chambers an axially adjustable metering valve element associated with said control port for controlling the flow from one chamber to the other through said control port, said housing having a fixed bypass port axially aligned with said control port and metering valve element and forming a fluid passageway connecting said chambers independently of said control port, a check valve element associated with the bypass port for normally preventing flow through the bypass port in the direction from one of said openings to the other but being free to open in response to a pressure at said other opening in excess of that at said one opening, said metering valve having a metering portion formed of a cross-section which progressively decreases along its length in one direction so that the effective size of said control port is increased as the metering valve element is adjusted in the opposite direction, and said check valve element being effective to open said bypass port when it moves in said opposite direction, said valve elements having normally spaced interengageable abutment surfaces which engage after a predetermined movement of said metering valve element in said opposite direction and are effective to cause said check valve element to open with the metering valve element as the metering valve element is moved in said opposite direction beyond said predetermined movement.

CHARLES H. HALLETT.
ELMER F. HEISER.

References Cited in the file of this patent

UNITED STATES PATENTS

| Number | Name | Date |
| --- | --- | --- |
| 606,535 | Glauber | June 28, 1898 |
| 893,418 | Avery | July 14, 1908 |
| 1,066,213 | Moore | July 1, 1913 |
| 2,518,212 | Wilson | Aug. 8, 1950 |